United States Patent [19]

Hunold et al.

[11] Patent Number: 4,687,655
[45] Date of Patent: Aug. 18, 1987

[54] PROCESS FOR THE MANUFACTURE OF SHAPED ARTICLES FROM REACTION-BONDED SILICON NITRIDE BY NITRIDATION UNDER ELEVATED NITROGEN GAS PRESSURE

[75] Inventors: Klaus Hunold, Lauben; Alfred Lipp, Bad Worishofen; Klaus Reinmuth, Durach; Peter Arnold, Sulzberg; Johannes Napholcz, Kempten, all of Fed. Rep. of Germany

[73] Assignee: Elektroschmelzwerk Kempten GmbH, Munich, Fed. Rep. of Germany

[21] Appl. No.: 850,748

[22] Filed: Apr. 11, 1986

[30] Foreign Application Priority Data

Apr. 19, 1985 [DE] Fed. Rep. of Germany ....... 3514284

[51] Int. Cl.$^4$ ................. C04B 35/58; C01B 21/063
[52] U.S. Cl. .................................... 423/344; 264/65; 501/97
[58] Field of Search ................ 264/65; 501/97; 423/344

[56] References Cited

U.S. PATENT DOCUMENTS

| | | | |
|---|---|---|---|
| 4,127,630 | 11/1978 | Washburn | 264/65 |
| 4,285,895 | 8/1981 | Mangels et al. | 264/65 |
| 4,351,787 | 9/1982 | Martinengo et al. | 264/65 |
| 4,500,482 | 2/1985 | Huther | 264/65 |

FOREIGN PATENT DOCUMENTS 1546928 5/1979 United Kingdom .

OTHER PUBLICATIONS

Kryl, J. A., Chem. Abstracts, 100:179168w.
Fujikawa et al, "Hot Isostatic Pressing: Its Application in High Performance Ceramics", 10-83, Japan.
Moulson, "Reaction-Bonded Silicon Nitride: Its Formation and Properties", 1979, pp. 1017-1051.

*Primary Examiner*—William R. Dixon, Jr.
*Assistant Examiner*—A. Knab
*Attorney, Agent, or Firm*—Burgess, Ryan & Wayne

[57] ABSTRACT

The invention is a process for the manufacture of shaped articles of reaction-bonded silicon nitride in which pre-shaped articles of silicon powder are heated in a first stage under a nitrogen gas pressure of at least 6 MPa at a heating rate of not more than 50° C. per hour to a reaction temperature below the melting point of silicon, the article is maintained at the reaction temperature for at least 0.5 hours and subsequently, in a second stage, heating the article at a heating rate of at least 500° C. per hour to a temperature above the melting point of silicon and maintaining the article at that temperature for from 1 to 7 hours. The process can nitridate both pre-shaped articles consisting of silicon powder and, optionally, up to 15% by weight $Si_3N_4$ powder and those containing up to 10% by weight of a sintering aid such as $Y_2O_3$. In the former case, porous shaped articles having a density of from 87 to 91% TD and, in the latter case, dense shaped articles having a density of more than 98% TD, are obtained. In all cases, in a total nitridation time of less than 15 hours, a conversion of at least 95% of the silicon originally present into silicon nitride is achieved, which, in the finished shaped article, is substantially in the $\beta$-modification.

10 Claims, No Drawings

PROCESS FOR THE MANUFACTURE OF SHAPED ARTICLES FROM REACTION-BONDED SILICON NITRIDE BY NITRIDATION UNDER ELEVATED NITROGEN GAS PRESSURE

The manufacture of shaped articles of reaction-bonded silicon nitride by nitridation of pre-shaped articles of silicon powder with nitrogen is known. Customary commercial reaction-bonded $Si_3N_4$ grades (known as RBSN) generally have a density in the range of 75–85% of the theoretically possible density of $Si_3N_4$ (hereinafter abbreviated to % TD), a porosity of from 15 to 30% and contain free silicon. The density that can be achieved depends on the density of the pre-shaped Si article and on the degree of nitridation, that is to say, the extent of conversion of silicon into $Si_3N_4$, which is generally approximately from 80 to 95%.

BACKGROUND OF THE INVENTION

It is known that, by adding sintering aids to the Si starting powder and by carrying out sintering, following nitridation, at temperatures above approximately 1600° C. with or without the application of pressure, it is possible to obtain reaction-bonded $Si_3N_4$ articles having densities of more than 95% TD. This process has the advantage, as compared with the direct sintering of $Si_3N_4$ powder with the addition of sintering aids, that during the temperature treatment of the pre-shaped articles, no shrinkage results from the nitridation in an atmosphere containing nitrogen and only slight shrinkage results from the post-sintering. As a result, it is possible to manufacture sintered shaped articles with great precision as to size, such precision usually being achieved only by mechanical finishing. Because of the hardness of the material, finishing of $Si_3N_4$ is very expensive and possible only with diamond tools (cf. DE-C2-28 55 785, DE-A-29 10 943, U.S. Pat. No. 4,285,895 and J. A. Mangels in "Ceramic Bulletin", vol. 60, No. 12 (1981), pages 1306–1310).

The strongly exothermic nitridation reaction itself is customarily carried out in several stages, whether or not sintering auxiliaries are used in the starting mixture. During the reaction, at temperatures below the melting point of silicon (1410° C.), one or more dwell times are introduced in order to avoid premature melting of the silicon. The last nitridation stage can be carried out either below or above the melting point of silicon. In all cases, however, this heating in stages results in a total nitridation time, especially in the case of relatively large shaped articles and relatively large charges, of more than 100 hours.

The admixture of hydrogen with the nitrogen gas or the presence of iron in the starting powder accelerates the nitridation reaction, thereby making it possible to reduce the total nitridation time a little. The effect of these measures and other parameters, such as purity and fineness of the starting powder, on the formation and the characteristics of reaction-bonded silicon nitride is described in detail in the review by A. J. Moulson in "Journal of Materials Science" 14 (1979), pages 1017–1051.

By using an atmosphere containing nitrogen to which hydrogen and an inert gas have been added and by controlling the temperature in relation to the gas consumption during the nitridation, it is possible to improve the characteristics of reaction-bonded silicon nitride. In this case also, however, more than 100 hours are required to obtain a high degree of nitridation (cf. J. A. Mangels in "Ceramic Bulletin", vol. 60, No. 6 (1981), pages 613–617).

By using especially fine and pure silicon starting powders, optionally in admixture with silicon nitride powders, and by pre-compacting the pre-shaped silicon article by sintering at temperatures below the melting point of silicon, it is disclosed that the nitridation time can be reduced (cf. GB-PS-15 46 928). It is stated in that specification that the time required to obtain a degree of nitridation of approximately 80% can be reduced to less than a day by applying a nitrogen overpressure of up to approximately 50 atmospheres (about 5 MPa). As is apparent from the Examples, the best results, however, were achieved at atmosphereic pressure in a stream of nitrogen and with the nitridation being continued for 100 hours.

The result of reaction-sintering silicon nitride at a nitrogen pressure of at most 100 MPa and at a temperature of at most 2000° C. has been examined in a study by J. A. Kryl in "Pri-vo i Primenenie Sverkhtverd, Materialov", Kiev 1983, pages 15–20 (ref. C.A. vol. 100: 179168 w). In that study it was found that, at a heating rate of less than 20° per minute, a nitrogen pressure of 10 MPa and with an isothermic dwell time of 4 hours, a degree of nitridation of 85.6% was achieved. At a nitrogen pressure of 100 MPa it was possible to produce specimen articles having a density of from 80 to 85% TD.

Similarly, T. Fujikawa et al. reported at the "International Symposium on Ceramic Components for Engines", Oct. 17–21, 1983, Hakone, Japan, on preliminary tests according to which, using a nitrogen pressure of approximately 500 Kgf/cm$^2$ (about 50 MPa), it was possible to obtain from silicon powder or from silicon powder in admixture with $Si_3N_4$ powder (50:50), reaction-sintered $Si_3N_4$ shaped articles having a density of at most 84% TD.

Although it is known that in processes for the manufacture of shaped articles of reaction-bonded silicon nitride by nitridation of pre-shaped articles of silicon powder in several stages using nitrogen under elevated pressure, the nitridation can be accelerated, the problem of achieving a reduction in the total nitridation time to less than 15 hours and increasing the conversion of silicon to silicon nitride to at least 95% has hitherto remained unsolved.

BRIEF SUMMARY OF THE INVENTION

According to the invention, by applying a nitrogen gas pressure of at least 6 MPa, under which the pre-shaped articles are, in a first stage, heated at a heating rate of not more than 50° C. per hour to a reaction temperature below the melting point of silicon, then maintained at the reaction temperature below the melting point of silicon for at least 0.5 hours and subsequently, in a second stage, heated at a heating rate of at least 500° C. per hour to a temperature above the melting point of silicon and maintained at a temperature above the melting point of silicon for from 1 to 7 hours, an article in which at least 95% of the silicon is converted to silicon nitride is produced.

DETAILED DESCRIPTION OF THE INVENTION

Using the process of the invention, it is possible to nitridate pre-shaped articles of any shape and size. The starting material used for the pre-shaped articles is preferably silicon powder having a mean particle size in the range of from 5 to 15 μm. The purity of the Si powder is not a critical factor, that is to say, it is possible to use either high purity Si powders having a free silicon content higher than 99.5% or less pure silicon powders having a free silicon content in the range of about 98%.

When using very fine Si powders which have powder particle sizes of less than 4 μm, the reactive surface of the pre-shaped articles is large. By adding up to 15% by weight $Si_3N_4$ powders to these starting Si powders, the reaction can be moderated.

The pre-shaped articles can also be manufactured with the addition of sintering aids. Sintering aids are materials which assist in compacting silicon nitride. Compositions such as magnesium oxide, yttrium oxide, aluminium oxide, iron oxide and beryllium oxide are useful as sintering aids. The sintering aids individually or in admixture with one another, are homogeneously mixed with the starting powder in amounts of up to about 10% by weight of the silicon powder.

Shaping of the starting powders or powder mixtures can be effected by known methods, for example by die-pressing, isostatic pressing, injection-moulding, continuous casting or slip casting at room temperature or elevated temperatures. Temporary binders can be used to aid in forming green compacts. After shaping, the green compacts preferably have a theoretical density (TD) of at least about 50%, more preferably at least about 60%, TD. Subsequently, the green compacts are preferably subjected to a thermal treatment to remove any temporary binders from the pre-shaped articles.

In order to carry out the process of the invention, the pre-shaped article is preferably placed in a graphite pot with a charge of an inert powder in such a manner as to provide for unrestricted access of the reaction gas to the article. The powder charge, which must be inert towards Si and $Si_3N_4$ can be for example, $Si_3N_4$ powder.

The graphite pot and its contents are placed in the furnace chamber of a pressure vessel, which can be an autoclave. During the heating phase up to approximately 400° C., the pressure vessel is preferably alternately evacuated and flushed with nitrogen in order to remove any foreign gases present. Subsequently, a nitrogen gas pressure greater than 6 MPa is applied to the pressure vessel and the temperature is further increased.

The reaction temperature for the first nitridation phase, below the melting point of silicon, is determined by the temperature at which the reaction of the nitrogen with the silicon occurs. The reaction temperature is dependent upon the fineness and purity of the silicon starting powder and can easily be established for each Si powder by thermogravimetric preliminary tests. It is preferable to introduce into the nitridation process, at about 50° to 100° C. below this reaction temperature, a prereaction dwell time or period of about 0.5 to 3 hours. The prereaction dwell period permits the pre-shaped article to reach about the same temperature throughout. The temperature is then increased at a heating rate, in accordance with the invention, of not more than about 50° C. per hour to the established reaction temperature below the melting point of silicon and is maintained at about the reaction temperature for from 0.5 to 3 hours. The length of the dwell time at about the reaction temperature below the melting point of silicon, is determined by the thickness and the weight of the pre-shaped silicon article. A greater weight of silicon to be nitridated liberates a greater amount of heat at the reaction temperature.

After the dwell period at the reaction temperature, the temperature is then increased at a heating rate, in accordance with the invention, of at least about 500° C. per hour to a final temperature above the melting point of silicon. The final temperature is preferably in the range of from about 1600° to 1800° C. This final temperature is maintained until at least 95%, preferably at least 98%, of the silicon originally present has been converted into $Si_3N_4$.

The dwell time at the final temperature, in accordance with the invention, is in the range of from about 1 to about 7 hours. The dwell time or period is dependent on the final temperature selected and on the particle size of the silicon starting powder. After the article has been held at the final temperature for the required time, the heating is switched off, and the system is cooled under pressure. An elevated pressure is preferably maintained until the temperature of the pressure vessel reaches the temperature at which the sintered article is to be removed from the vessel.

The process of the present invention produces from pre-shaped articles consisting of silicon powder and, optionally, up to 15% by weight silicon nitride powder, in a total nitridation time of less than 15 hours (without the cooling phase), porous shaped articles of reaction-bonded silicon nitride of any shape and size, having a density in the range of from about 87 to about 91% TD, in which the silicon nitride is substantially in the β-form.

Even when very pure Si powder is used, the total nitridation time is only slightly increased, in contrast to conventional nitridation processes which operate under atmospheric pressure.

By appropriate selection of the dwell time at the established reaction temperature and the heating rate in the second stage, it is possible to control the density distribution in the shaped articles. For example, shaped articles of reaction-bonded silicon nitride having a wall thickness greater than about 3 mm which have a dense outer layer having a high resistance to wear can be obtained by limiting the dwell time at the reaction temperature to less than about 1 hour and adjusting the heating rate to the final temperature to be at least 800° C. per hour. The nitrogen pressure is preferably increased at the same time. By this method, a shaped article is formed which has a surface layer of $Si_3N_4$ with a thickness of from 100 to 400 μm and a density of almost 100% which has a slightly higher proportion of free silicon that does the remainder of the material. This layer imparts to the shaped article increased resistance to abrasive wear.

When very fine Si powders are used, the addition of up to 15% by weight $Si_3N_4$ powder can moderate the initially vigorous reaction with nitrogen to such a degree that the heat of reaction can be removed sufficiently rapidly even in the case of thick-walled articles (>5 mm), thus preventing partial melting of the silicon. The total nitridation time is increased only insignificantly.

Larger additions of $Si_3N_4$ powder, on the other hand, produce no advantage with regard to the total nitridation time, but are a hindrance to adequate compacting. Thus, with more than 20% by weight silicon nitride powder, only densities of up to 85% TD can be obtained.

When sintering aids selected from the group of oxides are used, the nitridation is preferably carried out in a high-pressure autoclave (hot-isostatic press). In this case, in the second nitridation stage, at a temperature of at least about 1700° C., additional compacting can take place due to hot-isostatic compacting. On reaching a sinter density of at least 95% TD, there is no longer any open porosity in the reaction-bonded sintered compacts. As a result, because of the nitrogen gas pressure present, additional hot-isostatic compacting occurs. The additional hot-isostatic compacting can be increased by increasing the nitrogen gas pressure to at least about 150 MPa.

Pre-shaped articles consisting of silicon powder and up to 10% by weight sintering aids can be nitridated, sintered and hot-isostatically post-compacted in one working cycle in a high-pressure autoclave, to produce reaction-bonded silicon nitride sintered compacts of more than 98% TD.

The process according to the invention will be described in more detail in the following Examples which are presented for exemplification and not by way of limitations.

Two grades of silicon powder and a silicon nitride powder were used. The analyses of these starting powders are given below in % by weight:

|  | Si I | Si II | $Si_3N_4$ |
| --- | --- | --- | --- |
| $Si_{free}$ | 99.55 | 98.60 | 0.09 |
| $Si_3N_4$ | — | — | 98.10 |
| $O_2$ | 0.30 | 0.40 | 1.20 |
| Al | 0.05 | 0.15 | 0.15 |
| Ca | 0.04 | 0.06 | 0.02 |
| Fe | 0.02 | 0.50 | 0.05 |
| C | 0.01 | 0.20 | 0.30 |
| remainder | 0.03 | 0.09 | 0.09 |

EXAMPLE 1

The silicon powder Si II (mean particle size 13 μm) was cold-isostatically pressed at 400 MPa, using camphor as a temporary binder, to form crucibles of 100 mm diameter and 100 mm height having a wall thickness of 3 mm. After driving off the camphor in a drying chamber at approximately 120° C., the crucible was placed on a charge of $Si_3N_4$ powder and introduced in a graphite box into a hot-isostatic press. Slow heating was effected to a temperature of 400° C., during which the working chamber of the autoclave was repeatedly evacuated and refilled with nitrogen. Then, a nitrogen pressure of 20 MPa was applied and the furnace was heated to 1240° C. After a dwell time of 1 hour at 1240° C., heating was carried out at a rate of 50° C. per hour to the established reaction temperature of 1310° C. and the latter was maintained for 1 hour. Heating was then carried out at 600° C. per hour to a final temperature of 1650° C., the nitrogen pressure was increased to 35 MPa. The final temperature was maintained for 3 hours and the system was then cooled under pressure. The total cycle time, without cooling, was approximately 10 hours. 98.3% of the silicon had reacted to silicon nitride. The density of the article was 2.78 g/cm³ (approx. 87% TD).

EXAMPLE 2

The silicon powder Si II (mean particle size 13 μm) together with 5% by weight $Si_3N_4$ powder and camphor was cold-isostatically pressed at 400 MPa to form a slab (20 mm × 20 mm × 8 mm). Drying and heating to the reaction temperature under 20 MPa nitrogen pressure were carried out as described in Example 1. After a dwell time of 40 minutes at the reaction temperature of 1310° C., heating was carried out at a heating rate of 1000° C. per hour to a final temperature of 1700° C., the nitrogen pressure was simultaneously increased to 80 MPa. The final temperature was maintained for 4 hours and the system was then cooled under pressure. The total cycle time, without cooling, was approximately 11 hours. 96.9% of the silicon had reacted to silicon nitride. The density was 2.79 g/cm³ (approx. 87.5% TD). The dense surface layer had a thickness of approximately 200 μm.

EXAMPLE 3

The high-purity silicon powder Si I (mean particle size 8 μm) was cold-isostatically pressed at 400 MPa, with the addition of camphor, to form slabs (50 mm × 50 mm × 4 mm). Drying and nitridation were carried out as described in Example 1; the dwell time at the final temperature was increased to 4 hours. The cycle time was approximately 11 hours. 98.6% of the silicon had reacted to silicon nitride. The density was 2.81 g/cm³ (approx. 88% TD).

EXAMPLE 4

The silicon powder Si II was ground in a stirred ball mill to a mean particle size of 4 μm. The iron content thereby increased to 0.9% by weight. The silicon powder was mixed in a tumble mixer with 10% by weight silicon nitride powder (mean particle size 0.5 μm) and camphor and cold-isostatically pressed at 400 MPa to form a slab 50 mm × 50 mm × 10 mm. The camphor was driven off at 120° C. In a graphite box, the slab, on a powder charge of $Si_3N_4$, was introduced into a hot-isostatic press. The nitridation cycle was carried out in accordance with Example 1, but with a nitrogen pressure of 50 MPa being applied at 400° C. and with a first dwell time at 1280° C. of one hour. Up to a final temperature of 1750° C., the nitrogen pressure was increased to 100 MPa. The dwell time at the final temperature was 3 hours, which gave a cycle time of approximately 11 hours. The silicon nitride content of the article was 99.2% by weight and the density was 2.91 g/cm³ (approx. 91% TD).

EXAMPLE 5

The ground silicon powder Si II (according to Example 4) was mixed with camphor alone and cold-isostatically pressed at 400 MPa to form a cylinder of 15 mm diameter and 50 mm height. The camphor was driven off at 120° C. In a graphite box, the cylinder, on a powder packing of silicon nitride, was introduced into a hot-isostatic press and heated to 400° C. with alternate evacuation and flushing with nitrogen. Then a nitrogen pressure of 6 MPa was applied and heating was carried out at a heating rate of 500° C. per hour to 1200° C. The temperature was maintained for 2 hours at 1200° C.; thereafter, heating was carried out at 50° C. per hour to 1280° C. After a dwell time of 2 hours at 1280° C., heating was carried out at a heating rate of 700° C. per hour to the final temperature of 1750° C. which was maintained for three hours. The cycle time was approximately 12 hours. 98.7% of the silicon had reacted to silicon nitride. The density was 2.86 g/cm³ (approx. 89% TD).

EXAMPLE 6

The silicon powder Si I was ground in a stirred ball mill to a mean particle size of 0.8 μm. The iron content increased to 0.6% by weight. The silicon powder was homogeneously mixed with 8% by weight yttrium oxide powder and 1% by weight aluminum oxide powder and camphor in a tumble mixer and cold-isostatically pressed at 400 MPa to form slabs (50 mm×50 mm×10 mm). After driving off the camphor at 120° C. in a drying chamber, the slabs were placed on a powder charge of silicon nitride and introduced in a grpahite box into the hot-isostatic press. After evacuating and flushing with nitrogen while heating up to 400° C., a nitrogen pressure of 50 MPa was applied and the temperature was increased at a rate of 500° C. per hour to an intermediate temperature of 1170° C. The 1170° C. temperature was maintained for 3 hours; then the temperature was maintained for 3 hours; then the temperature was increased at a rate of 50° C. per hour to 1270° C., and maintained at 1270° C. for 2 hours. The article was then heated at a rate of 700° C. per hour to a final temperature of 1800° C. The nitrogen pressure of 80 MPa prevailing upon reaching the final temperature was, after a dwell time of 1 hour, increased over the course of one further hour to 150 MPa and, at that pressure, an additional dwell time of 1.5 hours was introduced. The cycle lasted approximately 14 hours. 99.1% of the silicon had reacted to silicon nitride. The density was 3.24 g/cm$^3$ (approx. 98% TD).

In all of the Examples, after nitridation, almost 100% of the silicon nitride was in the $\beta$-modification.

Cycles comparable to the Examples would last from 100 to 140 hours in the case of nitridation with nitrogen or nitrogen/hydrogen mixtures under normal pressure.

We claim:

1. A process for the manufacture of shaped articles of reaction bonded silicon nitride by nitridation of preshaped articles of silicon powder which comprises
   (a) placing the preshaped article of silicon powder in the furnace chamber of a pressure vessel, applying a nitrogen gas pressure of at least 6 MPa to said preshaped article in the pressure vessel and increasing the temperature at a heating rate of not more than 50° C. per hour to a reaction temperature below the melting point of silicon at which the reaction of the nitrogen with the silicon occurs;
   (b) maintaining said preshaped article at the reaction temperature below the melting point of silicon and under the nitrogen gas pressure of at least 6 MPa in the pressure vessel for at least 0.5 hours to form a prenitridated article;
   (c) heating said prenitridated article at a heating rate of at least 500° C. per hour to a final temperature above the melting point of silicon and maintaining said prenitridated article at the temperature above the melting point of silicon and under the nitrogen gas pressure of at least 6 MPa in the pressure vessel for from 1 to 7 hours until at least 95 percent of the silicon originally present have been converted into silicon nitride.

2. The process of claim 1 wherein a pre-shaped article of silicon powder and up to 15% by weight of the silicon nitride powder are nitrided to form a shaped silicon nitride article having a density of from about 87 to 91% TD.

3. The process of claim 1 wherein the preshaped article of silicon contains up to 10% by weight of at least one sintering aid selected from the group consisting of MgO, Y$_2$O$_3$, Al$_2$O$_3$, Fe$_2$O$_3$ and BeO.

4. The process of claim 2 wherein the preshaped article of silicon contains up to 10% by weight of at least one sintering aid selected from the group consisting of MgO, Y$_2$O$_3$, Al$_2$O$_3$, Fe$_2$O$_3$ and BeO.

5. The process of claim 3 wherein after the reacted article has been heated to at least about 1700° C., the nitrogen pressure is increased to at least 150 MPa.

6. The process of claim 1 wherein the pressure vessel is flushed with nitrogen while the pre-shaped article is being heated.

7. The process of claim 6 wherein the pressure vessel is flushed with nitrogen until the temperature of the preshaped article reaches about 400° C.

8. The process of claim 7 wherein the pressure vessel is evacuated and filled with nitrogen.

9. The process of claim 1 wherein the preshaped article is maintained at a temperature of from about 50° to 100° C. below the reaction temperature for a period of from about 0.5 to 3 hours.

10. The process of claim 3 wherein the preshaped article is maintained at a temperature of from about 50° to 100° C. below the reaction temperature for a period of from about 0.5 to 3 hours.

* * * * *